United States Patent Office 3,175,992
Patented Mar. 30, 1965

3,175,992
RUBBER PRODUCTS RESISTANT TO
RADIATION DAMAGE
Herbert R. Anderson, Jr., Bartlesville, Okla., assignor to Phillips Petroleum Company, a corporation of Delaware
No Drawing. Filed Aug. 21, 1958, Ser. No. 756,294
5 Claims. (Cl. 260—45.7)

This invention relates to rubber products resistant to radiation damage.

The word "rubber" as used herein includes both natural and synthetic rubbery materials.

Rubber vulcanizates, when subjected to ionizing radiation, undergo deterioration in stress-strain properties, this being due to chain scission and cross linking. For instance, when some vulcanizates are subjected to radiation, such as alpha rays, beta rays, gamma rays, or neutrons, there is a considerable increase in the modulus of the product and the number of network claims, related to cross links, is increased. Other vulcanizates, when subjected to the same radiation, are degraded to softer and even liquid products. Such changes are undesirable in either case because the physical properties of the rubber are harmed by this radiation.

Some research has been done to determine what additives can be incorporated in the rubber to produce products which are resistant to radiation or at least more resistant than the material without the use of such additives. These additives are referred to as radiation damage inhibitors or anti-rads. I have discovered a group of compounds which are very effective in reducing this deterioration or radiation damage. Broadly, the invention comprises a method comprising incorporating in rubber during the compounding thereof a compound having the formula $$R\text{---}S_x\text{---}R'$$

where $x$ is an integer selected from the group consisting of 1 and 2, R is aryl and R' is selected from the group consisting of aryl and hydrogen in an amount of 5 to 10 parts per 100 parts of said rubber, vulcanizing the composition, and exposing the vulcanized composition to ionizing radiation of $1 \times 10^5$ to $5 \times 10^8$ roentgens, said composition having less change in modulus than the same composition without the addition of said R—$S_x$—R' compound.

The following, therefore, are objects of this invention.

An object of my invention is to provide rubber vulcanizates which are resistant to radiation damage. A further object of my invention is to provide compositions containing certain sulfur derivatives which make the product exhibit less change in modulus than the same product without the additive. A further object of this invention is to provide a method of reducing damage to rubber when subjected to ionizing radiation.

Other objects and advantages of my invention will be apparent to one skilled in the art upon reading this disclosure.

The radiation inhibitors of this invention have the formula R—$S_x$—R' and include thiols or mercaptans and mono- and disulfides. One aromatic group is required and both R and R' can be aromatic, such groups being phenyl and naphthyl groups. The aryl radicals can contain substituents including —$NO_2$; halogen; —OH; —SH; —$SO_3H$; OCN; —NCO; —SCN; —NCS; alkyl; alkoxy;

where X is hydrogen, alkyl, or aryl; —N=N—Y, where Y is alkyl or aryl; and mixtures thereof. Where alkyl or alkoxy groups are present each group should not contain more than 4 carbon atoms and the carbon atoms in the total of such groups should not exceed 12. Specific examples of these compounds include
thiophenol,
thio-1-naphthol,
thio-2-naphthol,
2-methylthiophenol,
4-methylthiophenol,
2,3-diethylthiophenol,
2-methyl-4-ethylthiophenol,
2,4,6-tributylthiophenol,
4-methoxythiophenol,
2,4-diethoxythiophenol,
2-methyl-6-propoxythiophenol,
1-thiophenol-4-sulfonic acid,
4-mercaptobenzonitrile,
2-mercaptophenylcyanate,
3-mercaptophenylisothiocyanate,
2,6-dinitrothiophenol,
4-chlorothiophenol,
4-mercaptophenol,
2,4,6-dichloro-3,5-di-n-propylthiophenol,
3,5-dibromo-2,4,6-trimethoxythiophenol,
4-methylthio-1-naphthol,
2,8-diethylthio-2-naphthol,
4,5-dinitrothio-1-naphthol,
8-ethoxythio-2-naphthol,
4,5-dimercapto-2-naphthol,
thio-1-naphthol-4-sulfonic acid,
8-cyanothio-1-naphthol,
5,7-dibromothio-2-naphthol,
1,4-diethyl-7-tert-butylthio-2-naphthol,
2-mercaptonaphthyl-4-cyanate,
1-mercaptonaphthyl-8-isocyanate,
2-mercaptonaphthyl-7-thiocyanate,
2,4-dimercapto-3-naphthionitrile,
2,7-diiodo-4,5-dimethylthio-1-naphthol,
2,7-di-tert-butyl-4-butoxythio-1-naphthol,
2,4,6,8-tetraethylthio-1-naphthol,
diphenyl sulfide,
1-naphthyl phenyl sulfide,
2-naphthyl phenyl sulfide,
diphenyl disulfide,
1-naphthyl phenyl disulfide,
2-naphthyl phenyl disulfide,
di-1-naphthyl disulfide,
di-2-naphthyl disulfide,
bis(2,4-dinitrophenyl) sulfide, bis(2,4-dinitrophenyl) disulfide,
bis(2-nitrophenyl) disulfide,
bis(4-nitrophenyl) disulfide,
bis(4-tert-butylphenyl) sulfide,
bis(4-tert-butylphenyl) disulfide,
bis(2,4-dimethylphenyl) disulfide,
bis(2-methyl-4-isopropylphenyl) disulfide,
bis(2-methyl-1-naphthyl) disulfide,
bis(4-ethyl-2-naphthyl) disulfide,
bis(2,7-dimethyl-1-naphthyl) disulfide,
bis(1-mercapto-4,5-dinitro-2-naphthyl) sulfide,
bis(4-nitrophenyl) sulfide,
bis(2,4-dichlorophenyl) disulfide,
bis(4-hydroxy-2,6-dimethylphenyl) disulfide,
bis(3-sulfophenyl) sulfide,
bis(4-cyanophenyl) sulfide,
4-methoxy-2-naphthyl phenyl disulfide,
4-(phenylmercapto)phenylisocyanate,
1-(phenylmercapto)-3-naphthylcyanate,
bis(2,6-dichloro-4-nitro-3,5-dimethylphenyl) disulfide,
bis(3,6-disulfo-2-naphthyl) disulfide,
bis(4,5-dicyano-2,7-diethyl-1-naphthyl) sulfide,
3,6-dicyano-2,4,5,7-tetramethyl-1-naphthyl 4-hydroxyphenyl sulfide,
3,6-diethoxy-2-naphthyl 3,5-dibromophenyl disulfide,
4-phenylmercaptoazobenzene,
bis(4-aminophenyl) disulfide,
bis(2,4-dimethylaminophenyl) disulfide, and
bis(4-phenylazophenyl) disufide.

The amount of inhibitor employed should be at least 5 parts by weight per 100 parts by weight of rubber used. Over 10 parts by weight is seldom necessary and a preferred range is 5 to 7 parts by weight.

The invention is applicable to all types of rubber, both natural and synthetic. The synthetic polymers include the groups prepared by polymerizing a conjugated diene of 4 to 10 carbon atoms, either alone, or in combination with an unsaturated comonomer such as styrene, acrylonitrile, methacrylonitrile, methyl vinyl ether, methyl methacrylate, and the like. Generally, the conjugated diene, such as butadiene, isoprene, hexadiene, etc., comprises a major amount of the monomer system. The invention is also applicable to polychloroprene and rubbers of the polyurethane and isocyanate types. For a more complete discussion of the various synthetic rubbers, attention is directed to Whitby, "Synthetic Rubber," published by John Wiley and Sons, Inc., New York, 1954.

The following examples are forth specific compositions made according to the present invention but obviously, considerable variation is possible from the specific amounts set forth in the examples.

*Examples*

A 75/25 butadiene/styrene rubber was prepared by emulsion polymerization at 41° F. to give a polymer having a raw Mooney value (ML-4) of 52 and a bound styrene content of 20 percent. A recipe for the production of such a polymer is:

| | Parts by weight |
|---|---|
| Butadiene | 75 |
| Styrene | 25 |
| Water | 180 |
| Rosin soap, K salt | 4.5 |
| Tamol N [1] | 0.15 |
| $Na_3PO_4 \cdot 12H_2O$ | 0.80 |
| p-Menthane hydroperoxide | 0.12 |
| $FeSO_4 \cdot 7H_2O$ | 0.20 |
| $K_4P_2O_7$ | 0.30 |
| Tert-dodecyl mercaptan, as required for a 52 ML-4 rubber. | |

[1] Sodium salt of a naphthalene sulfonic acid condensed with formaldehyde.

This rubber was compounded using various inhibitors, the amount being 5 parts by weight in each case and a control was made with no inhibitor. The recipe was

| | |
|---|---|
| Butadiene/styrene rubber | 100 |
| Carbon black [1] | 50 |
| Zinc oxide | 3 |
| Stearic acid | 1 |
| Flexamine [2] | 1 |
| Sulfur | 1.75 |
| Santocure [3] | 1 |

[1] Philblack O, a high abrasion furnace black.
[2] A physical mixture containing 65 percent of a complex diarylamine-ketone reaction product and 35 percent of N,N'-diphenyl-p-phenylenediamine.
[3] N-cyclohexyl-2-benzothiazylsulfenamide.

The stocks were roll milled, sheeted off the mill, and cured 30 minutes at 307° F. Tensile specimens ⅛" wide and 2" long (length of test portion) were cut from the sheets which were 25–30 mils in thickness. Swell specimens ½" x 1" were also cut from the sheets. The specimens were packed into aluminum cans which were closed, purged with helium, and irradiated in a field of gamma rays from spent fuel elements from the Materials Testing Reactor at Arco, Idaho, at a canal temperature of approximately 75° F. A pressure of 25 pounds helium was maintained in the cans during irradiation. Runs were made with total dosages of $1 \times 10^7$ roentgens, $3 \times 10^7$ roentgens, $7 \times 10^7$ roentgens, and $1 \times 10^8$ roentgens. One set of samples was not irradiated but was reserved for control purposes. The irradiated materials were removed from the gamma ray field and physical properties were determined.

In the following tables the original 100 percent modulus is set forth as well as the original density of network chains. In the subsequent columns the numerical change in these properties is set forth. From these tables it is apparent that each of the inhibitors brought about a reduction in change in 100 percent modulus and in the density of network chains.

| | 100% Modulus (p.s.i.) | | | | |
|---|---|---|---|---|---|
| | Original | Increase in p.s.i. after Nominal Radiation Dose ($10^7$ Roentgens) | | | |
| | | 1 | 3 | 7 | 10 |
| None | 450 | 300 | 590 | 1,410 | 1,910 |
| Thio-2-naphthol | 230 | 180 | 410 | 660 | 1,020 |
| Phenyl monosulfide | 370 | 230 | 450 | 900 | 1,410 |
| Bis(2,4-dinitrophenyl) disulfide | 610 | 230 | 550 | 1,020 | 1,480 |
| Bis(2-nitrophenyl) disulfide | 340 | 160 | 450 | 890 | 1,320 |
| Bis(4-nitrophenyl) disulfide | 370 | 200 | 480 | 870 | 1,310 |

| | Density of network chains×$10^4$ (moles/cc.) [1] | | | | |
|---|---|---|---|---|---|
| | Original | Increase after Nominal Radiation Dose ($10^7$ Roentgens) | | | |
| | | 1 | 3 | 7 | 10 |
| None | 2.01 | 0.71 | 2.19 | 3.14 | 4.61 |
| Thio-2-naphthol | 1.09 | 0.67 | 1.38 | 2.07 | 3.19 |
| Phenyl monosulfide | 1.74 | 0.45 | 1.23 | 2.57 | 4.30 |
| Bis(2,4-dinitrophenyl) disulfide | 2.90 | 0.54 | 1.25 | 2.48 | 3.72 |
| Bis(2-nitrophenyl) disulfide | 1.54 | 0.52 | 1.50 | 2.54 | 3.64 |
| Bis(4-nitrophenyl) disulfide | 2.26 | 0.64 | 1.82 | -------- | 4.24 |

[1] The density of network chains is related to the number of crosslinks by the function $$\nu = 2n - \frac{2\delta}{M}$$

where $n$ is the number of crosslinks, $\delta$ is the density of the polymer, and $M$ is the molecular weight.

As many possible embodiments can be made of this invention without departing from the scope thereof, it is to be understood that all matter herein set forth is to be interpreted as illustrative and not as unduly limiting the invenion.

I claim:
1. A composition produced by vulcanizing in the presence of sulfur a mixture of a rubbery polymer of butadiene and styrene and, per 100 parts by weight of said polymer, 5 to 10 parts of a sulfur compound selected from the group consisting of phenyl monosulfide, bis(2,4-nitrophenyl) disulfide, bis(2-nitrophenyl) disulfide, and bis(4-nitrophenyl) disulfide.
2. The composition of claim 1 wherein said sulfur compound is phenyl monosulfide.
3. The composition of claim 1 wherein said sulfur compound is bis(2,4-nitrophenyl) disulfide.
4. The composition of claim 1 wherein said sulfur compound is bis(2-nitrophenyl) disulfide.
5. The composition of claim 1 wherein said sulfur compound is bis(4-nitrophenyl) disulfide.

References Cited in the file of this patent
UNITED STATES PATENTS

| | | |
|---|---|---|
| 2,422,156 | Wolf et al. | June 10, 1947 |
| 2,556,856 | Swaney et al. | June 12, 1951 |
| 2,687,444 | Crouch et al. | Aug. 24, 1954 |
| 2,878,175 | Golub | Mar. 17, 1959 |

OTHER REFERENCES

Rubber Chem. and Technology, Imoto, vol 26, 1953, pages 91–101. Pages 91 and 97 relied upon.

Bovey: "Effects of Ionizing Radiation on Natural and Synthetic High Polymers," Interscience Publishers, New York (1958), pages 2, 5, and 32.